GEORGE DUERRE.
Improvement in Hoisting Gear.
No. 120,951.
Patented Nov. 14, 1871.
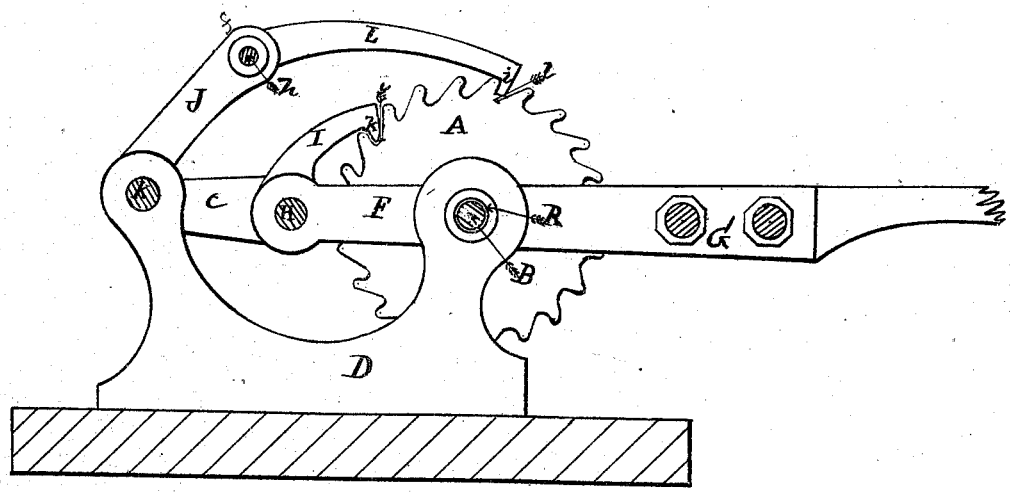
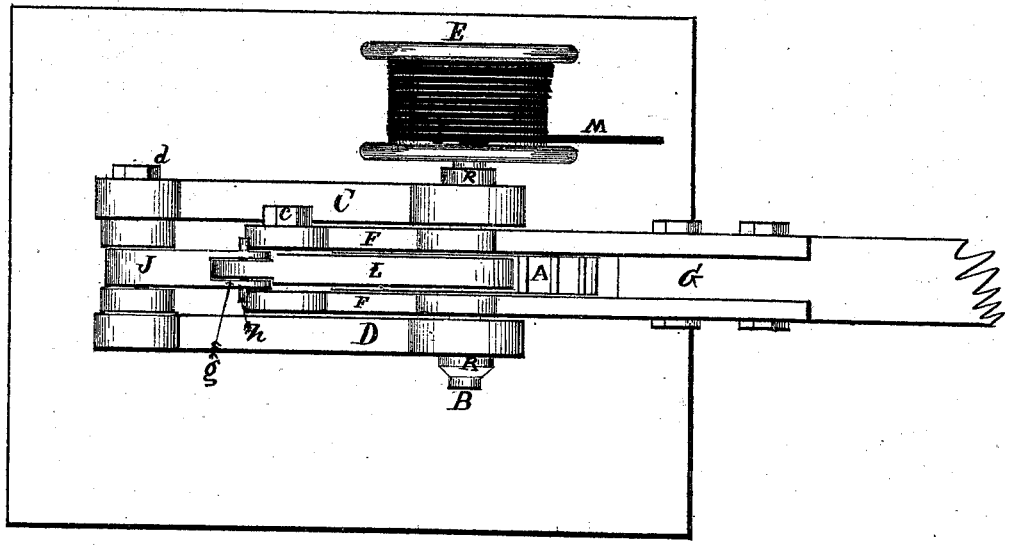
Witnesses
Franklin Barritt.
Richard Garner.
Inventor
George Duerre.
Henry Garner,
Attorney.

UNITED STATES PATENT OFFICE.

GEORGE DUERRE, OF WILLIAMSBURG, NEW YORK.

IMPROVEMENT IN HOISTING-GEARS.

Specification forming part of Letters Patent No. 120,951, dated November 14, 1871.

*To all whom it may concern:*

Be it known that I, GEORGE DUERRE, of Williamsburg, State of New York, have invented certain Improvements in Hoisting-Gears; and the following is a specification of the same.

The object of my invention is to furnish a hoisting-gear which is constructed of few parts, not liable to get out of order, easy to transport, and is cheap and simple to manufacture.

Figure I is a side view of a hoisting-gear embodying my invention. Fig. II is a plan view of the same.

A is a ratchet-wheel keyed onto the axis B, which is covered with tube R, said tube resting on the two supports or bearers C and D. To said axis B is securely fastened or keyed the pulley E. On both sides of the ratchet-wheel is a fork, F, placed in such a manner that the tube R is keyed to both legs of said fork, extending outside the teeth of the ratchet-wheel, where suitable holes are bored through the ends of said fork to receive a bolt, H, and nut c. This bolt is inserted for the purpose of carrying the ratchet I and also arm e of the elbow-lever J. The other ends of the supports or bearers C and D carry the bolt K and nut d, which serves as a fixed point or pivot for the motion of the elbow-lever J. The other arm f of said elbow-lever terminates in the fork g, the legs of which carry the bolt h, which serves as a pivot for the ratchet L. The two ratchets I and L are provided with hooks i and k, which fall into the teeth-grooves l l in the ratchet-wheel A in such a manner, by the motion derived from the elbow-lever J, that the hooks of the two ratchets alternately grasp the teeth of the ratchet-wheel, by which the wheel derives a rotary motion, and, being keyed to the axis B, also gives the pulley E, keyed to said axis, a like rotary motion. Thus, a rope or wire, M, fastened to said pulley will, by the rotary motion, be wound round and upon said pulley, by which the required motion for a hoisting-gear is obtained.

Having thus described my invention, I desire to claim—

The within-described hoisting-gear, consisting of the frame C D, axis B, tube R, windlass E, ratchet-wheel A, bifurcated lever G pivoted to the arm e and pawl I, and the long pawl L pivoted to the arm J of the elbow-lever, all constructed and arranged to operate substantially as and for the purposes set forth.

GEORGE DUERRE.

Witnesses:
A. C. CRONDAL,
FRANKLIN BARRITT.

(79)